(12) United States Patent
Desai et al.

(10) Patent No.: US 12,340,576 B2
(45) Date of Patent: Jun. 24, 2025

(54) AIRCRAFT CLASSIFICATION FROM AERIAL IMAGERY

(71) Applicant: Orbital Insight, Inc., Palo Alto, CA (US)

(72) Inventors: Shasvat Mukeshkumar Desai, Cambridge, MA (US); Kaushik Patnaik, Cupertino, CA (US)

( * ) Notice: Subject to any disclaimer, the term of this patent is extended or adjusted under 35 U.S.C. 154(b) by 490 days.

(21) Appl. No.: 17/321,176

(22) Filed: May 14, 2021

(65) Prior Publication Data

US 2022/0366167 A1 Nov. 17, 2022

(51) Int. Cl.

| | |
|---|---|
| *G06F 18/243* | (2023.01) |
| *G06F 18/21* | (2023.01) |
| *G06F 18/214* | (2023.01) |
| *G06F 18/2413* | (2023.01) |
| *G06N 5/04* | (2023.01) |
| *G06N 20/00* | (2019.01) |
| *G06T 7/60* | (2017.01) |

(Continued)

(52) U.S. Cl.
CPC .......... *G06V 20/13* (2022.01); *G06F 18/2148* (2023.01); *G06F 18/2178* (2023.01); *G06F 18/2413* (2023.01); *G06F 18/24317* (2023.01); *G06N 5/04* (2013.01); *G06N 20/00* (2019.01); *G06T 7/60* (2013.01); *G06V 10/40* (2022.01); *G06T 2207/10032* (2013.01); *G06V 2201/08* (2022.01)

(58) Field of Classification Search
CPC ........ G06V 20/13; G06V 20/17; G06V 10/40; G06V 10/774; G06V 10/82; G06V 2201/08; G06F 18/2148; G06F 18/2178; G06F 18/2413; G06F 18/24317; G06F 18/24323; G06N 5/04; G06N 20/00; G06T 7/60; G06T 2207/10032
See application file for complete search history.

(56) References Cited

FOREIGN PATENT DOCUMENTS

| | | |
|---|---|---|
| CN | 111582237 | 8/2020 |
| CN | 111582237 A | 8/2020 |
| JP | 2020-197983 | 12/2020 |

OTHER PUBLICATIONS

Zuo et al., Aircraft Type Recognition Based on Segmentation with Deep Convolutional Neural Networks, Feb. 2018, IEEE Geoscience and Remote Sensing Letters, 15(2): 282-287. (Year: 2018).*

(Continued)

*Primary Examiner* — Aaron W Carter
*Assistant Examiner* — Kathleen M Broughton

(57) ABSTRACT

A system and method are disclosed for determining a classification and sub-classification of an aircraft. The system receives an aerial image of a geographic area that includes one or more aircrafts. The system inputs the aerial image into a machine learning model. The system receives an output from the machine learning model for each aircraft of the one or more aircrafts. Based on the output for each aircraft, the system determines a set of geometric measurements. The system compares the set of geometric measurements to a plurality of known sets of geometric measurements. Based on the comparison, the system identifies a known set of geometric measurements from the plurality of known sets of geometric measurements. The known set is mapped by a database to a sub-classification. The system outputs the sub-classification.

18 Claims, 5 Drawing Sheets

(51) Int. Cl.
*G06V 10/40* (2022.01)
*G06V 20/13* (2022.01)

(56) References Cited

OTHER PUBLICATIONS

Das et al., A System for Aircraft Recognition in Perspective Aerial Images, Dec. 1994, IEEE Workshop on Applications of Computer Vision, pp. 1-8. (Year: 1994).*
Alganci et al., Comparative Research on Deep Learning Approaches for Airplane Detection from Very High Resolution Satellite Images, Feb. 2020, Remote Sensing, 12 (458): 1-28. (Year: 2020).*
Zhao et al., Aircraft Recognition Based on Landmark Detection in Remote Sensing Images, Aug. 2017, IEEE Geoscience and Remote Sensing Letters, 14(8): 1413-1417. (Year: 2017).*
Azam et al., Aircraft Classification Based on PCA and Feature Fusion Techniques in Convolutional Neural Network, Dec. 2021, IEEE Digital Object Identifier, 9: 161683-161694. (Year: 2021).*
Liu et al., S2CGNet: A Robust Aircraft Detector Based on the Sword-Shaped Component Geometry, 2023, IEEE Transactions on Geoscience and Remote Sensing, 61(2023): 1-15. (Year: 2023).*
Teng et al., Aircraft Pose Estimation Based on Geometry Structure Features and Line Correspondences, 2019, Sensors, 19 (2165) pp. 1-26. (Year: 2019).*
European Patent Office, Extended European Search Report and Opinion, European Patent Application No. 22173310.8, Sep. 14, 2022, 12 pages.
Jiawei, Z. et al., "Aircraft Type Recognition Based on Segmentation With Deep Convolutional Neural Networks," IEEE Geoscience and Remote Sensing Letters, vol. 15, No. 2, Feb. 1, 2018, pp. 282-286.
Li, Y. et al., "Category-Aware Aircraft Landmark Detection," IEEE Signal Processing Letters, vol. 28, Dec. 18, 2020, pp. 61-65.
Japan Patent Office, Office Action, Japanese Patent Application No. 2022-079332, May 30, 2023, 8 pages.
Zuo, J. et al., "Aircraft Type Recognition Based on Segmentation with Deep Convolutional Neural Networks," IEEE Geoscience And Remote Sensing Letters, vol. 15, No. 2, Jan. 11, 2018, pp. 282-286.

\* cited by examiner

AIRCRAFT CLASSIFICATION FROM AERIAL IMAGERY

TECHNICAL FIELD

This disclosure relates generally to processing aerial imagery, and, in particular, to aircraft classification from aerial imagery.

BACKGROUND

The ability to classify vehicles (e.g., aircraft, cars, trucks, boats, ships, other types of vehicles, etc.) from aerial imagery may be a valuable resource in many scenarios. For example, determining what type of aircraft are located at a particular location, such as an airport, airfield, base, or on an aircraft carrier, may assist in detection and/or surveillance activities.

Conventional methodologies used to classify vehicles from aerial imagery may include manually classifying the vehicles and/or utilizing existing artificial intelligence (AI) methodologies to classify the vehicles. Manual classification is a laborious and time-consuming task for an individual to undertake. Tens to hundreds of vehicles may be captured in a single aerial image (e.g., an image of an airport may include hundreds of aircraft) and for an individual to analyze and classify each vehicle in an image can take several hours, maybe even several days. Additionally, the individual would require specialized training to distinguish between similar-looking vehicles as sizes, shapes, and/or colors that may differentiate one vehicle from another are hard to distinguish in an aerial image where the vehicles appear very small. For example, a vehicle, such as an aircraft, may be depicted in an aerial image that has a five meter spatial resolution with only a few pixels (e.g., five pixels long and two pixels wide). In order to manually classify vehicles captured in an aerial image, an individual would have to be trained to identify very fine details in the aerial image in order to classify each vehicle into over hundreds of different classification and sub-classification combinations. Additionally, manual classification can often be inaccurate due to poor image quality of aerial imagery and/or lighting differences, terrain differences, and/or seasonal differences in aerial imagery.

Existing AI methodologies are insufficient to automatically classify vehicles captured in aerial images due to how small the vehicles appear in the captured images and/or poor image quality. A vehicle can appear indistinguishable due to its small size in the image and/or due to poor image quality that obscures some or all of the vehicles in the image. Thus, an AI model may output inaccurate classifications or fail to classify vehicles captured in the image. Additionally, significantly large training sets are necessary to sufficiently train an AI model due to the large number of possible classifications for any given vehicle captured in an image. A cost (e.g., time, money, resources, etc.) to generate the large training set can outweigh any benefits.

Existing technology is insufficient to classify vehicles in aerial imagery at a large-scale in an accurate and efficient manner. Thus, by using existing technology, a classification of a vehicle may be inaccurate and/or be determined too late for any worthwhile intelligence to be derived from the classification.

SUMMARY

A system and process for automating classification of vehicles captured in aerial imagery is disclosed herein. In an example embodiment, the system and process classifies an aircraft (vehicle) captured in a satellite image (aerial imagery) quickly and accurately. Technical improvements are disclosed herein, including a machine learning model that identifies and provides meaningful information about each vehicle (e.g., about each aircraft) captured in an aerial image. The information is further analyzed by the system via a heuristics-based approach to determine a set of geometric measurements for each vehicle. The set of geometric measurements are compared to known sets of geometric measurements stored in a database. The comparison provides a unique sub-classification (e.g., a make and model) of each vehicle. Disclosed by way of example embodiments are computer program products (e.g., a non-transitory computer-readable storage media that stores instructions executable by one or more processors), a method, and/or a system for analyzing an aerial image from an aerial imaging device to classify each vehicle in the image.

In one example embodiment, an aircraft classification system is disclosed that receives an aerial image of a geographic area that includes one or more aircrafts. The aircraft classification system further inputs the aerial image into a machine learning model. For each aircraft of the one or more aircrafts, the aircraft classification system receives output from the machine learning model. The output includes a bounding polygon corresponding to the aircraft, a classification, and a plurality of keypoints. For each aircraft of the one or more aircrafts and based on the output of the machine learning model, the aircraft classification system determines a set of geometric measurements corresponding to the aircraft, compares the set of geometric measurements to a plurality of known sets of geometric measurements corresponding to the classification, and identifies, based on the comparison, a known set of geometric measurements from the plurality of known sets of geometric measurements. The known set is mapped by a database to a sub-classification. The aircraft classification system outputs the sub-classification.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates an example system for classifying aircraft, in accordance with an embodiment.

DETAILED DESCRIPTION

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

Figure 1:
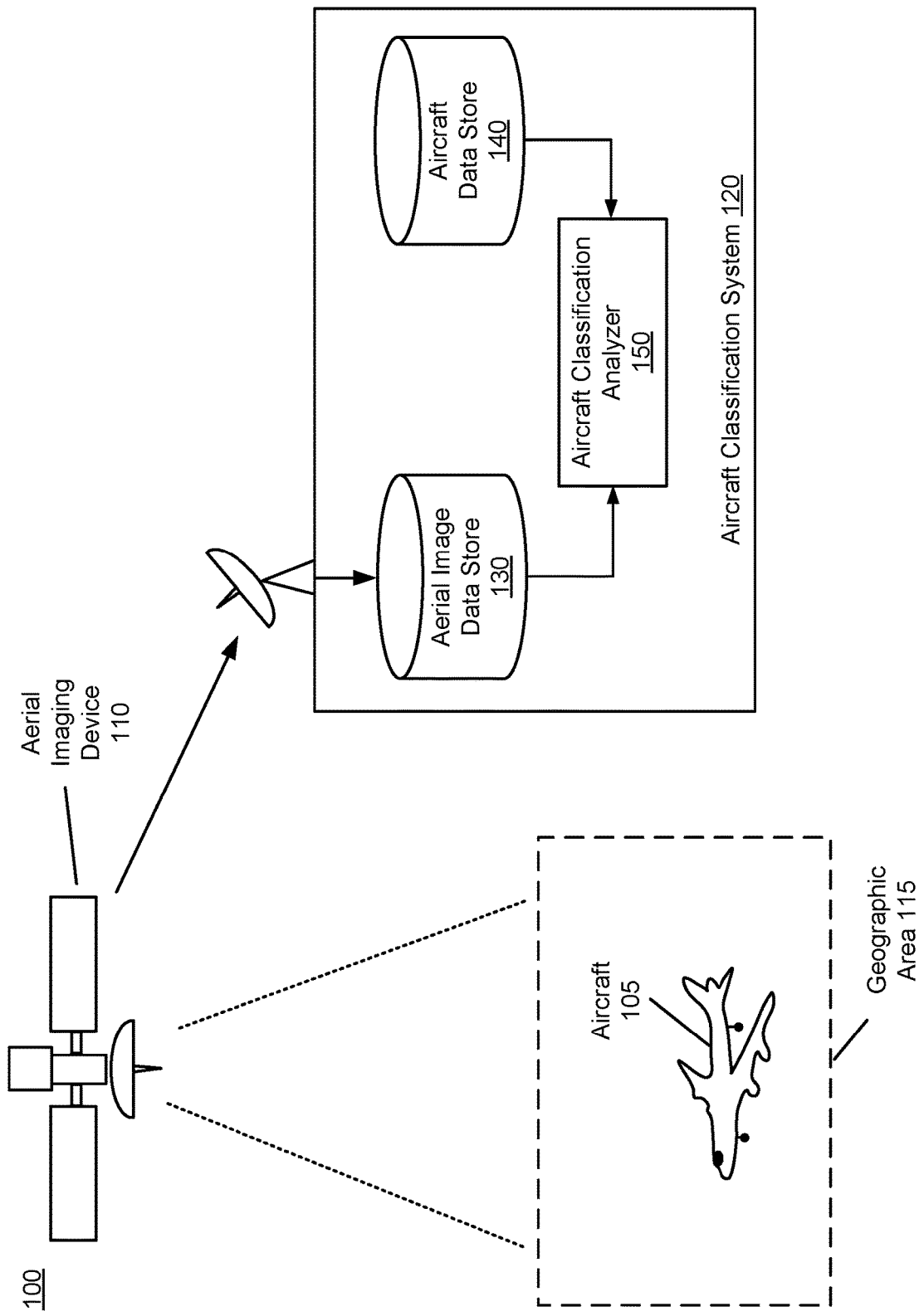

Figure (FIG. 1 illustrates an example system for classifying aircraft, in accordance with an embodiment. The example system environment shown in FIG. 1 may include an aerial imaging device 110, a geographic area 115 including one or more aircrafts 105, and an aircraft classification system 120 with an aerial image data store 130, an aircraft data store 140, and an aircraft classification analyzer 150.

The aerial imaging device 110 captures one or more aerial images of the geographic area 115. For example, the aerial imaging device 110 may capture a static image at a particular time or capture a sequence of images over a period of time. In some embodiments, the aerial imaging device 110 may capture visible light. Additionally or alternatively, the aerial imaging device 110 may capture non-visible light (e.g., infrared light), where, optionally, the non-visible light may be converted to an image (e.g., using a heat map corresponding to radiation intensity). The aerial imaging device 110 may be any imaging device associated with a satellite, an airplane, a balloon, a drone, or any other device that provides a view from above the geographic area 115. The aerial imaging device 110 captures one or more aerial images of one or more aircrafts 105 in the geographic area 115. The one or more aircrafts 105 may be stationary or in motion. The captured images may be of various spatial resolutions. The aerial imaging device 110 transmits the captured images to the aircraft classification system 120 for storing in the aerial image data store 130. The captured images may include various other objects besides the one or more aircrafts 105. For example, the images may include other vehicles (e.g., cars, trucks, etc.), buildings, animals, and/or people.

The aircrafts 105 are any vehicles capable of flight. Examples of aircraft 105 include an airplane, a balloon, a helicopter, an airship, a glider, a paramotor, etc. An aircraft 105, such as an airplane, may include forward-sweep wings or back-sweep wings. The aerial images captured by the aerial imaging device 110 may include any number of aircrafts 105. The aircrafts 105 may be distinguishable by classifying each aircraft 105 by classification and sub-classification. The classification for an aircraft 105 may correspond to a type of aircraft. For example, the classification for an aircraft 105 may include bomber, fighter, helicopter, small-aircraft, large-commercial, and large-military. The sub-classification for an aircraft 105 may correspond to a model of aircraft or a make and model of aircraft. For example, the model for an aircraft 105 may correspond to a name of the aircraft and/or the name and year of manufacture and the make of the aircraft may correspond to a manufacturer of the aircraft. The sub-classification may be, e.g., LOCKHEED MARTIN™ F-16, B-52, BOEING™ 737, etc. The classification and sub-classification for each aircraft 105 captured in an aerial image is determined by the aircraft classification system 120 as described in further detail below.

The geographic area 115 is an area on a surface, and includes all non-occluded features (natural and man-made) within that area. Non-occluded features of an aircraft 105 provide sufficient features visible to the aerial imaging device 110 (e.g., within a field of view of the aerial imaging device 110) such that the aircraft 105 is identifiable. For example, half of an aircraft 105 is positioned under an airplane hangar (occluded by the hangar) and the other half is positioned outside the airplane hangar (not occluded by the hangar). The non-occluded features within the geographic area 115 include the half of the aircraft 105 positioned outside the airplane hangar and visible to the aerial imaging device 110. The definition of the geographic area 115 may be provided by a requestor, such as a user or third-party entity, to the aircraft classification system 130, e.g., by using an application programming interface (API) or graphical user interface (GUI). The geographic area 115 may be defined by a closed boundary on the surface. The closed boundary itself may be defined using various connected geographic markers, which may be indicated using geographic coordinates, such as longitude and latitude indicators. Alternatively, the geographic area 115 may be defined by a set of vectors describing the closed boundary. In some cases, the geographic area 115 may be defined using multiple closed boundaries, with each closed boundary defined using one of the methods noted above. In another embodiment, the geographic area 115 is defined using a cartographical indicator, i.e., a commonly, conventionally, administratively, or legally agreed upon indicator of a bounded area on a land surface. For example, these cartographic indicators may include a point of interest, landmark, address, postal code, city/town/village, metropolitan area, country, province/county, airport, airfield, neighborhood, unincorporated area, a region surrounding a cartographical indicator, and so on, plus or minus a tolerance area beyond (or within) the cartographic indicators, which may be defined in absolute or percentage from the cartographic indicators. In some embodiments, the region surrounding the cartographical indicator may be defined by a default amount (e.g., a default radius around the indicator). In some embodiments, the region surrounding the cartographical indicator may be calculated based on a value defined by the requestor. For example, where the cartographical indicator is an address and the value defined by the requestor is 1 mile, the region surrounding the cartographical indicator is a 1 mile radius centered at the address.

The geographic area 115 represents a geographic location for which information, such as the sub-classification for each aircraft 105 located within the geographic area 115, is of interest to the requestor. For example, the requestor may be interested in determining what aircraft were previously or currently located at a particular location (e.g., at an airfield, an airport, a military base, on an aircraft carrier, etc.) for surveillance purposes, based on a mechanism of determining a classification and a sub-classification for aircraft 105 as part of the invention. In another example, the requestor may be interested in determining information about travel (e.g., travel statistics) for an airport based on sub-classification determinations for aircraft 105 previously or currently located at the airport.

Although the geographic area 115 is shown as bounded by rectangular dotted lines in FIG. 1 for illustrative purposes, as described above, it may be defined using a variety of methods and may not correspond to rectangular boxes as shown. This may be indicated graphically or textually.

In addition to transmitting the captured aerial image(s), the aerial imaging device 110 transmits the location information for the geographic area 115 captured in the aerial image(s) to the aircraft classification system 120 for storage in the aerial image data store 130. In some embodiments, the aerial imaging device 110 may transmit metadata regarding itself to the aerial image data store 130, such as a time of image captured (e.g., local time or universal time/GMT), a geospatial and/or geographical location of device 110 at image capture, angle of the device 110 with regard to surface normal during image capture, spatial resolution of image, ground sample distance (GSD), and so on. The geospatial and/or geographic location may be indicated using geographic coordinates, e.g., latitude, longitude, or other methods, such as those used to define the geographic area 115 as described above. The current time may be indicated in varying levels of accuracy, e.g., millisecond, second, minute, or day level of accuracy. For example, the current time may be indicated in a 64-bit integer using the Unix time format.

The aircraft classification system 120 classifies one or more aircraft 105 captured in an aerial image by determining a sub-classification for each aircraft 105. In one embodiment, the aircraft classification system 120 includes the aerial image data store 130, the aircraft data store 140, and the aircraft classification analyzer 150. In various embodiments, the aircraft classification system 120 may include fewer or additional components.

In some embodiments, the aircraft classification system 120 may request the aerial imaging device 110 capture one or more aerial images of a specific geographic area 115. The aircraft classification system 120 requests the aerial images, the location information for the geographic area captured in the aerial images, and/or metadata about the aerial imaging device 110 that captured the aerial images from the aerial imaging device 110 and stores this information in the aerial image data store 130. In some embodiments, the aircraft classification system 120 periodically requests this information (e.g., every day, every week, every month, every quarter, etc.).

The aerial image data store 130 stores data received from the aerial imaging device 110. The data may include captured aerial images, location information about the geographic area 115 captured in each image, and/or the device 110 metadata. For example, each entry in the aerial image data store 130 may include a captured aerial image, corresponding location information for the geographic area 115 captured in the aerial image, and aerial imaging device 110 metadata corresponding to the device 110 that captured the image. The aerial image data store 130 stores additional data including a plurality of labeled aerial images. The labeled aerial images may be used as training data. The plurality of labeled aerial images may be provided by the aircraft classification analyzer 150 or by a third-party entity. Any data may be stored in the aerial image data store 130 indefinitely or may be stored for a particular amount of time (e.g., for one year, for two years, etc.).

The aircraft data store 140 stores aircraft classification information. The aircraft classification information may be used by the aircraft classification analyzer 150 to determine a sub-classification for each aircraft 105 captured in an aerial image. The information may include attributes about an aircraft including a classification, a sub-classification, and a known set of geometric measurements. The known set of geometric measurements may include various geometric measurements that describe the aircraft, such as various length measurements, width measurements, and angle measurements. Some or all of the information in the aircraft data store 140 may be retrieved from a third-party entity (e.g., a military database, a commercially available database, etc.). Any data may be stored in the aircraft data store 140 indefinitely or may be stored for a particular amount of time (e.g., for one year, for two years, etc.).

The aircraft classification analyzer 150 classifies aircraft 105 captured in aerial images. In some embodiments, the aircraft classification analyzer 150 automatically classifies all captured aerial images received and stored in the aerial image data store 130. In some embodiments, the aircraft classification analyzer 150 automatically classifies all captured aerial images associated with a particular geographic area 115 (e.g., as specified by the requestor). In some embodiments, the aircraft classification analyzer 150 classifies certain aerial images (e.g., aerial images of a particular geographic area 115 captured at specific time(s) as specified by the requestor).

To classify aircraft 105 captured in an aerial image, the aircraft classification analyzer 150 requests a captured aerial image from the aerial image data store 130. For example, a user of the aircraft classification system 120 may request that a captured image of a specific geographic area 115 be analyzed by the aircraft classification analyzer 150. The user may provide geographic coordinates that specify the geographic area 115 and, in some embodiments, may provide a specific capture time of interest when requesting a captured aerial image. The aircraft classification analyzer 150 receives the aerial image from the aerial image data store 130 that satisfies the criteria provided by the user. In some embodiments, the aircraft classification analyzer 150 may receive more than one aerial image from the aerial image data store 130 that satisfies the user-specified criteria (e.g., coordinates and/or time). In these embodiments, the aircraft classification analyzer 150 may provide the aerial images to the user for review and approval. For example, the user selects which aerial images will be processed further by the aircraft classification analyzer 150. In addition to the aerial images, the aircraft classification analyzer 150 may provide other relevant information to the user regarding the aerial images including corresponding metadata about the aerial imaging device 110 that captured the corresponding aerial image. In some embodiments, the aircraft classification analyzer 150 may perform various pre-processing of the aerial images prior to presenting the images to the user for review and approval. For example, the aircraft classification analyzer 150 may pansharpen two aerial images of the geographic area 115 to create a single high-resolution color image of the geographic area, may perform orthorectification on an aerial image, may determine an amount of cloud cover present in an aerial image (e.g., a percentage of cloud cover area compared to total area of image), etc.

The aircraft classification analyzer 150 analyzes the provided or user-selected aerial image via a machine learning model to identify each aircraft 105 present in the image. The aircraft classification analyzer 150 determines a set of geometric measurements for each aircraft 105 present in the aerial image based on an output from the machine learning model and compare the set of geometric measurements for each aircraft 105 to the known sets of geometric measurements stored in the aircraft data store 140 to determine a sub-classification for each aircraft 105. Additional details regarding the aircraft classification analyzer 150 are described below with reference to FIG. 2.

By using the aircraft classification system 120, a requestor can more accurately determine a model (e.g., a sub-classification) for each aircraft 105 identified within an aerial image. This data may be used to determine, for a specific geographic area 115, valuable information about what models of aircraft 105 are present, about what models of aircraft 105 were present at a particular time, how many aircrafts 105 of a particular model are present, how many aircrafts 105 of a particular model were present at a particular time, and/or how many aircrafts 105 of a particular model were present over a time period (e.g., over several hours, days, etc.). This information may further be utilized by the requesting party to determine additional information related to surveillance, shipping, and/or transportation and travel.

In another example embodiment (not shown) a system may classify other vehicles captured in an aerial image. For example, a system may classify motor vehicles (e.g., cars, trucks, etc.). In another example, a system may classify watercraft (e.g., boats, ships, etc.). In another example, a system may classify aircraft, motor vehicles, and watercraft. For any system that classifies motor vehicles, a motor vehicle data store may be included. The motor vehicle data store stores motor vehicle classification information, such as a classification, a sub-classification, and a known set of geometric measurements for motor vehicles. For example, the classification may describe the type of motor vehicle, such as truck, jeep, sedan, compact, SUV, etc., the sub-classification may be a make and model for the motor vehicle, such as HONDA CIVIC™, TOYOTA CAMRY™, etc., and the known set of geometric measurements may include various lengths and widths of the motor vehicle. For any system that classifies watercraft, a watercraft data store may be included. The watercraft data store stores watercraft classification information, such as a classification, a sub-classification, and a known set of geometric measurements for watercraft. For example, the classification may describe the type of watercraft, such as motorboat, catamaran, cruiser, destroyer, etc., the sub-classification may be a make and model for the watercraft, such as Farrier Marine F-45, OCEANCO™ Jubilee, Gulf Craft Majesty 122, INGALLS SHIPBUILDING™ Ticonderoga, etc., and the known set of geometric measurements may include various lengths and widths of the watercraft.

A vehicle classification analyzer receives an aerial image from the aerial image data store 130 and analyzes the provided aerial image via a machine learning model to identify each vehicle (e.g., motor vehicle, watercraft, aircraft, etc.) present in the image. The vehicle classification analyzer determines a set of geometric measurements for each vehicle present in the aerial image based on an output from the machine learning model and compare the set of geometric measurements for each vehicle to the known sets of geometric measurements stored in the motor vehicle data store, watercraft data store, and/or the aircraft data store 140 to determine a sub-classification for each vehicle. Determining sub-classifications for what vehicles are located and/or were previously located at a particular geographic area 115, such as a building, parking garage, factory, dock, port, or some other location, may assist in surveillance, tracking, determining information about shipping, determining information about travel, determining information about transportation, etc.

Example Aircraft Classification System

Figure 2:
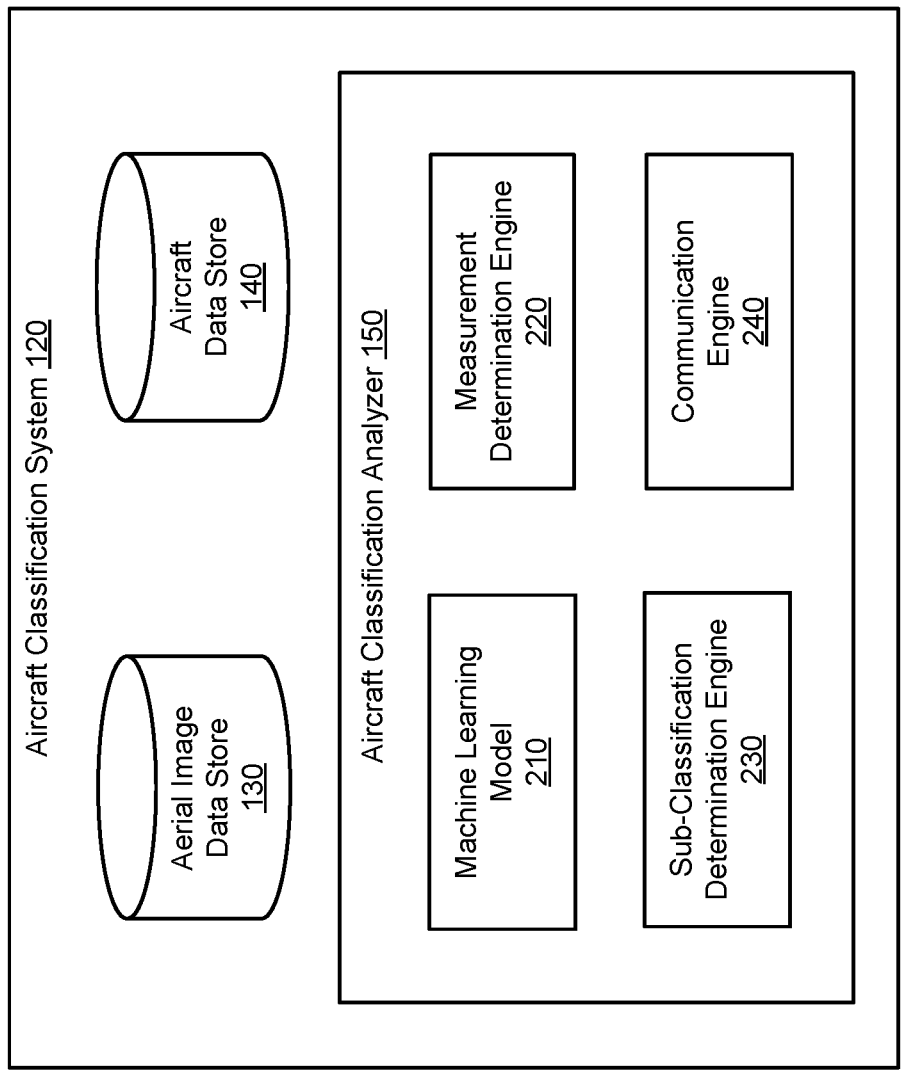
FIG. 2 is a block diagram of an aircraft classification system, in accordance with an embodiment.

FIG. 2 is a block diagram of an aircraft classification system, in accordance with an embodiment. As depicted, in FIG. 2, aircraft classification system 120 includes the features depicted in FIG. 1, where aircraft classification analyzer 150 includes machine learning model 210, measurement determination engine 220, sub-classification determination engine 230, and communication engine 240. The models, engines, and data stores depicted in FIG. 2 are merely exemplary, and fewer or additional components may be used to achieve the functionality described herein. Moreover, aircraft classification system 120 and its components may be distributed over a plurality of servers and/or devices connected by a data network.

The aircraft classification system 120 classifies one or more aircrafts captured in an aerial image (e.g., a satellite image) by inputting the aerial image into a machine learning model 210, determining a set of geometric measurements corresponding to each aircraft based on an output of the machine learning model 210, and determining a sub-classification (e.g., a make and model) for each aircraft. The sub-classification is output (e.g., via an application programming interface (API) or a graphical user interface (GUI)) to a user of the aircraft classification system 120. As shown, the aircraft classification system 120 includes the aerial image data store 130, the aircraft data store 140, and the aircraft classification analyzer 150. The aircraft classification analyzer 150 includes the machine learning model 210, a measurement determination engine 220, a sub-classification determination engine 230, and a communication engine 240. In various embodiments, the aircraft classification system 120 and/or the aircraft classification analyzer 150 may include fewer or additional components that are not shown in FIG. 2. For example, the aircraft classification analyzer 150 may include a filtering engine that filters the aerial image prior to inputting the image into the machine learning model 210. As described above, the filtering engine may perform pansharpening on aerial images, orthorectification, or analysis regarding cloud cover present in the aerial image. In some embodiments, the functions of the aircraft classification system 120 and/or the aircraft classification analyzer 150 may be distributed among the components in a different manner than described.

The aircraft classification analyzer 150, as described above, controls the operation of the aircraft classification system 120. For example, the aircraft classification analyzer 150 receives an aerial image from the aerial image data store 130 and inputs the image into the machine learning model 210. In some embodiments, the user of the aircraft classification system 120 may instruct the aircraft classification analyzer 150 to request a specific aerial image from the aerial image data store 130 to analyze. For example, the user may request an aerial image of a particular geographic area 115 by providing coordinates or some other type of location identifier to the aircraft classification analyzer 150. In another example, the user may request an aerial image of a particular geographic area 115 that was captured at a specific time. In another example, the user may review and select which aerial image of a plurality of aerial images of the particular geographic area 115 is to be processed further by the aircraft classification analyzer 150. The aircraft classification analyzer 150 analyzes the received aerial image or user-selected aerial image from the aerial image data store 130 and provides a sub-classification for each aircraft captured in the aerial image to the user.

To perform the analysis of an aerial image, the machine learning model 210 of the aircraft classification analyzer 150 receives, as input, the aerial image and outputs, for each aircraft in the image, a bounding polygon, a classification, and a plurality of keypoints. The bounding polygon is a two-dimensional shape that encompasses an aircraft in the aerial image. The classification describes a type of aircraft.

The classification may include bomber, fighter, helicopter, small-aircraft, large-commercial, large-military. The plurality of keypoints designate certain parts of the aircraft. Each keypoint is located on the aerial image at a pixel location (e.g., an x and y coordinate) of the aerial image. For example, a keypoint may be located at image coordinate (100, 100). In some embodiments, the plurality of keypoints may include five keypoints. The keypoints may include a nose keypoint, a center keypoint, a left wing keypoint, a right wing keypoint, and a tail keypoint. For example, the nose keypoint is located at a pixel location of the aircraft that includes the nose of the aircraft. In some embodiments, the machine learning model 210 outputs the input aerial image with the bounding polygon, the classification, and the plurality of keypoints for each aircraft included on the aerial image. For example, the bounding polygon, the classification, and the plurality of keypoints for each aircraft may overlay or be included on the original aerial image. This embodiment is described in further detail in FIG. 3.

The machine learning model 210 is trained to predict which pixels within an image correspond to an aircraft. For example, the machine learning model 210 may use known object recognition techniques to identify objects (e.g., aircraft, buildings, etc.) captured in an aerial image. By predicting which pixels within the image correspond to an aircraft, the machine learning model 210 can determine the bounding polygon, the classification, and the plurality of keypoints corresponding to those pixels. The machine learning model 210 may be trained using training data comprising labeled aerial images. The training data may be stored in the aerial image data store 130. Each labeled aerial images include at least one aircraft. For each aircraft in a labeled image, the labeled image includes at least a corresponding bounding polygon and a label indicating a classification. In some embodiments, the labeled aerial image may further include a plurality of keypoints for each aircraft. The plurality of keypoints in the labeled aerial image may designate which keypoint is a nose keypoint, a center keypoint, a left wing keypoint, a right wing keypoint, and a tail keypoint. In some embodiments, the training data comprises multiple labeled images (e.g., on the order of hundreds) for each classification of aircraft.

During training of the machine learning model 210, the training data may be augmented to include a plurality of rotations of the labeled images and/or a plurality of adjustments of the labeled images. The plurality of rotations may rotate a labeled image in plane such that the machine learning model 210 is trained to identify which pixels correspond to an aircraft regardless of the aircraft's orientation in plane in the image. The plurality of adjustments may augment an image quality of a labeled image. For example, the plurality of adjustments may include an intensity adjustment, a contrast adjustment, and/or a jitter adjustment. The intensity adjustment brightens or darkens some or all of the pixels within the labeled image. The contrast adjustment increases or decreases differences in color of some or all of the pixels within the labeled image. The jitter adjustment replaces some or all pixels with a neighboring pixel (e.g., a first pixel is replaced with a neighboring pixel that is within a specified radius of the first pixel). By adjusting the intensity, the contrast, and/or the jitter of a labeled image in the training data, the machine learning model 210 is trained to identify which pixels correspond to an aircraft regardless of any lighting differences, any terrain differences, any weather differences, and/or any seasonal differences that may be captured in aerial images.

During operation of the machine learning model 210, the machine learning model 210 may receive, as input, an aerial image that has been filtered by a filtering engine of the aircraft classification analyzer 150. The filtering engine may apply a filter to the aerial image to adjust a spatial resolution of the image to be a particular spatial resolution. The particular spatial resolution being a spatial resolution on which the machine learning model 210 has been trained (e.g., the training data included labelled aerial images of solely the particular spatial resolution). For example, the filtering engine may apply a filter to adjust the spatial resolution of the image to be 0.5 m per pixel (the particular spatial resolution). In another embodiment, the filter engine may filter out any aerial image that is not a particular spatial resolution or any aerial image that is not at least a threshold spatial resolution. For example, the filtering engine may monitor the aerial image(s) prior to being input into the machine learning model 210 and if the filtering engine determines an image to not be at least 0.5 m per pixel (a threshold spatial resolution), the filtering engine does not input the image into the machine learning model 210.

The machine learning model 210 identifies for an input aerial image where each aircraft is located in the image and determines a bounding polygon that encompasses each identified aircraft. The machine learning model 210 may be a neural network, a deep learning model, a convolutional neural network, etc. In some embodiments, the machine learning model 210 may utilize known image processing techniques on areas of the image within bounding polygons to identify a plurality of keypoints. A keypoint will be located at a pixel location of the aircraft on the aerial image and the plurality of keypoints will be included within the bounding polygon.

In some embodiments, the machine learning model 210 may fail to provide an output for the aerial image. For example, the machine learning model 210 may output a probability that corresponds to a confidence of the output. The airport classification analyzer 150 may compare the probability to a threshold probability. The threshold probability may be specified by the user or a default value of the system. If the probability is less than the threshold probability, the aircraft classification analyzer 150 via the communication engine 240 may provide an alert to the user that the machine learning model 210 has failed. In another example, the machine learning model 210 may output a probability corresponding to the bounding polygon, a probability corresponding to the classification, and a probability corresponding to the plurality of keypoints for an aircraft. Each probability may be compared to a corresponding threshold probability. If any one of the probabilities is less than its corresponding threshold probability, the aircraft classification analyzer 150 via the communication engine 240 may provide an alert to the user that the machine learning model 210 has failed and which of the bounding polygon, the classification, and/or the plurality of keypoints specifically failed. In some embodiments, the user may manually label the aerial image via the communication engine 240. The machine learning model 210 may receive label instructions from the user and re-train the machine learning model 210 using the manually labelled aerial image. For example, the manually labeled aerial image is added to the training data and stored in the aerial image data store 130.

The measurement determination engine 220 determines a set of geometric measurements for each aircraft in the aerial image based on the output from the machine learning model 210. For example, the measurement determination engine 220 receives the output from the machine learning model 210 and analyzes the plurality of keypoints corresponding to an aircraft. The measurement determination engine 220 determines a set of geometric measurements for an aircraft based on the plurality of keypoints corresponding to the aircraft and a spatial resolution of the aerial image. The set of geometric measurements may correspond to real-world geometric measurements for an aircraft. In some embodiments, the set of geometric measurements may include one or more of a length of an aircraft, a wingspan of the aircraft, and a sweep angle of the aircraft. In some embodiments, the set of geometric measurements may include additional measurements, such as a width of a wing, a width of a tail, a length from a center of the aircraft to a nose, a length from the center of the aircraft to a tail, and/or any other suitable geometric measurement that describes the aircraft.

The measurement determination engine 220 may calculate a length of an aircraft by determining a distance between the nose keypoint and the tail keypoint of the aircraft and multiplying the distance by the spatial resolution of the aerial image. Similarly, the measurement determination engine 220 may calculate a wingspan of the aircraft by determining a distance between the right wing keypoint and the left wing keypoint and multiplying the distance by the spatial resolution. The measurement determination engine 220 may determine the sweep angle (e.g., a backward sweep angle) for the aircraft by forming a triangle with the tail keypoint, the center keypoint, and one of the right wing keypoint or the left wing keypoint as vertices of the triangle. The measurement determination engine 220 calculates a measurement for an angle of the triangle at the vertex corresponding to the center keypoint. The measurement determination engine 220 determines the angle by applying the cosine rule to the triangle. The angle is trigonometrically related to the sweep angle. For example, the sweep angle is 90 degrees minus the angle.

In an example implementation, the measurement determination engine 220 receives as output, from the machine learning model 210, the inputted aerial image overlaid with a plurality of keypoints for an aircraft present in the image and a classification of fighter for the aircraft. The nose keypoint is located at pixel coordinate (100, 100), the center keypoint is located at pixel coordinate (85, 90), the left wing keypoint is located at pixel coordinate (75, 95), the right wing keypoint is located at pixel coordinate (90, 70), and the tail keypoint is located at pixel coordinate (70, 75). The spatial resolution for the inputted aerial image is 0.5 m per pixel. The measurement determination engine 220 calculates the length of the aircraft, the wingspan, and the sweep angle for the aircraft. The measurement determination engine 220 determines the length to be 19.5 m, the wingspan to be 14.5 m, and the sweep angle to be approximately 31 degrees.

In some embodiments, the measurement determination engine 220 receives the output from the machine learning model 210 and determines types of wings. For example, the measurement determination engine 220 determines a type of left wing (or right wing) to be either forward-sweep or back-sweep depending on the pixel locations of the plurality of keypoints. In another example, the measurement determination engine 220 determines a type of tail wing based on the plurality of keypoints. In this example, the plurality of keypoints identified by the machine learning model 210 may include additional keypoints designating various tips of the tail wing of the aircraft.

The sub-classification determination engine 230 determines a sub-classification for each aircraft identified by the machine learning model 210 in the aerial image. In some embodiments, the sub-classification determination engine 230 utilizes a heuristics-approach to determine a sub-classification for each aircraft. In some embodiments, the sub-classification may correspond to a model of an aircraft. In other embodiments, the sub-classification may correspond to a make and model for an aircraft. The make is a manufacturer of the aircraft and the model is a name of the aircraft and/or the name and year of manufacture. For example, the make and model may be a General Dynamics F-16, whereas the model is F-16. The sub-classification determination engine 230 may compare the set of geometric measurements determined by the measurement determination engine 220 for an aircraft and the classification for the aircraft determined by the machine learning model 210 to known sets of geometric measurements stored in the aircraft data store 140.

As described above, a known set of geometric measurements may be mapped by the aircraft data store 140 to a classification and a sub-classification. The aircraft data store 140 may be controlled by a same entity controlling the airport classification analyzer 150 or may be controlled by a separate entity (e.g., a third-party entity). As such, the geometric measurements of a known set of geometric measurements may include various lengths, widths, and angle measurements that describes an aircraft. Thus, a known set of geometric measurements comprises a plurality of candidate geometric measurements (e.g., a wingspan, a width of a tail, a length of a tail, a length of the aircraft, a width of a wing, a sweep angle, etc.). The sub-classification determination engine 230 may analyze the known sets of geometric measurements stored in the aircraft data store 140 to determine which candidate geometric measurements of the plurality of candidate geometric measurements uniquely identify a sub-classification when compared with the set of geometric measurements determined by the measurement determination engine 220. For example, the sub-classification determination engine 230 may determine that the candidate geometric measurements of a length of the aircraft, a wingspan, a width of a wing, and a length from a center to a tail of the known sets of geometric measurements will be compared with the corresponding geometric measurements of the set geometric measurements as determined by the measurement determination engine 220. By comparing these geometric measurements, the sub-classification determination engine 230 will uniquely identify a sub-classification for each aircraft in the captured image. In another example, the sub-classification determination engine 230 may determine that the candidate geometric measurements of a length of the aircraft, a wingspan, and a sweep angle of the known sets of geometric measurements will be compared with the corresponding geometric measurements of the set geometric measurements as determined by the measurement determination engine 220. Again, by comparing these geometric measurements, the sub-classification determination engine 230 will uniquely identify a sub-classification for each aircraft in the captured image.

The sub-classification determination engine 230 compares the set of geometric measurements (e.g., a length of the aircraft, a wingspan, and a sweep angle) to the plurality of known sets of geometric measurements based on the classification determined by the machine learning model 210. In some embodiments, the sub-classification determination engine 230 determines which known set of geometric measurements includes geometric measurements within a predetermined threshold of the geometric measurements of the set of geometric measurements. The predetermined threshold may be provided by the user or may be a default value. The threshold may be a given tolerance above or below a given value, such as +/−5 m, +/−10 m, +/−5%, +/−10%, +/−15%, etc.

For the example implementation discussed above, the sub-classification determination engine 230 compares the set of geometric measurements (i.e., the length of 19.5 m, the wingspan of 14.5 m, and the sweep angle of approximately 31 degrees) to a plurality of known sets of geometric measurements stored in the aircraft data store 140 that correspond to a classification of fighter. The sub-classification determination engine 230 determines the sub-classification of Sukhoi Su-35 includes geometric measurements within a predetermined threshold of the set of geometric measurements.

The communication engine 240 controls communication from and/or to various components of the system and the user. For example, the communication engine 240 may provide an API and/or a GUI to a client device operated by the user. The user may input a request for aircraft classification to be performed on a user-specified aerial image. The communication engine 240 may output the sub-classification(s) of aircraft present in the aerial image to the user via the API or GUI. For example, the communication engine 240 may present the original aerial image to the user with a label for each aircraft that provides information, including the sub-classification corresponding to each aircraft. In some embodiments, the label for each aircraft may further include a classification, a set of geometric measurements, a numerical and/or alphabetical reference identifier that uniquely identifies each aircraft in the image, or any combination thereof. The label may further include confidence information regarding the sub-classification, classification, set of geometric measurements, or any combination thereof. The communication engine 240 may further provide the user with a report that lists each aircraft captured in the aerial image by their corresponding numerical and/or alphabetical reference identifier and other label information. The report may additionally include a tally of each sub-classification of aircraft present in the captured aerial image and/or manufacturing metadata of the sub-classification of aircraft. In some embodiments, the report may further include information about which sub-classifications with known sets of geometric measurements were not within the predetermined threshold of the set of geometric measurements, but were within a secondary predetermined threshold of the geometric measurements of the set of geometric measurements. The secondary predetermine threshold being greater than the predetermined threshold. The communication engine 240 can further provide a graphic (e.g., a stock image) of each sub-classification of aircraft.

Additionally or alternatively, the communication engine 240 may provide any or all of the output from the machine learning model 210, the measurement determination engine 220, and the sub-classification engine 230 to another entity or system for further analysis to be performed. For example, another system may perform analysis on a series of aerial images for a same geographic area over a time period. This analysis may provide information about how many, which classifications, and which sub-classifications of aircraft are present at a location over the course of several hours, days, weeks, months, etc.

In some embodiments (not shown), a vehicle classification analyzer may control the operation of a vehicle classification system. As described above, a vehicle classification system may classify motor vehicles, aircraft, and/or watercraft captured in aerial imagery. The vehicle classification system may operate in a similar manner to the airport classification system. A machine learning model may identify motor vehicles, aircraft, and/or watercraft in an image and output a bounding polygon, a classification, and a plurality of keypoints for each vehicle identified. A measurement determination engine may analyze the plurality of keypoint for each vehicle and determine a set of geometric measurements for each vehicle. For each vehicle, a sub-classification determination engine may compare the set of geometric measurement as determined by the measurement determination engine to the classification information stored in a aircraft data store 140, a motor vehicle data store, and/or a watercraft data store to determine the sub-classification for the vehicle.

Data Flow for Machine Learning Model

Figure 3:
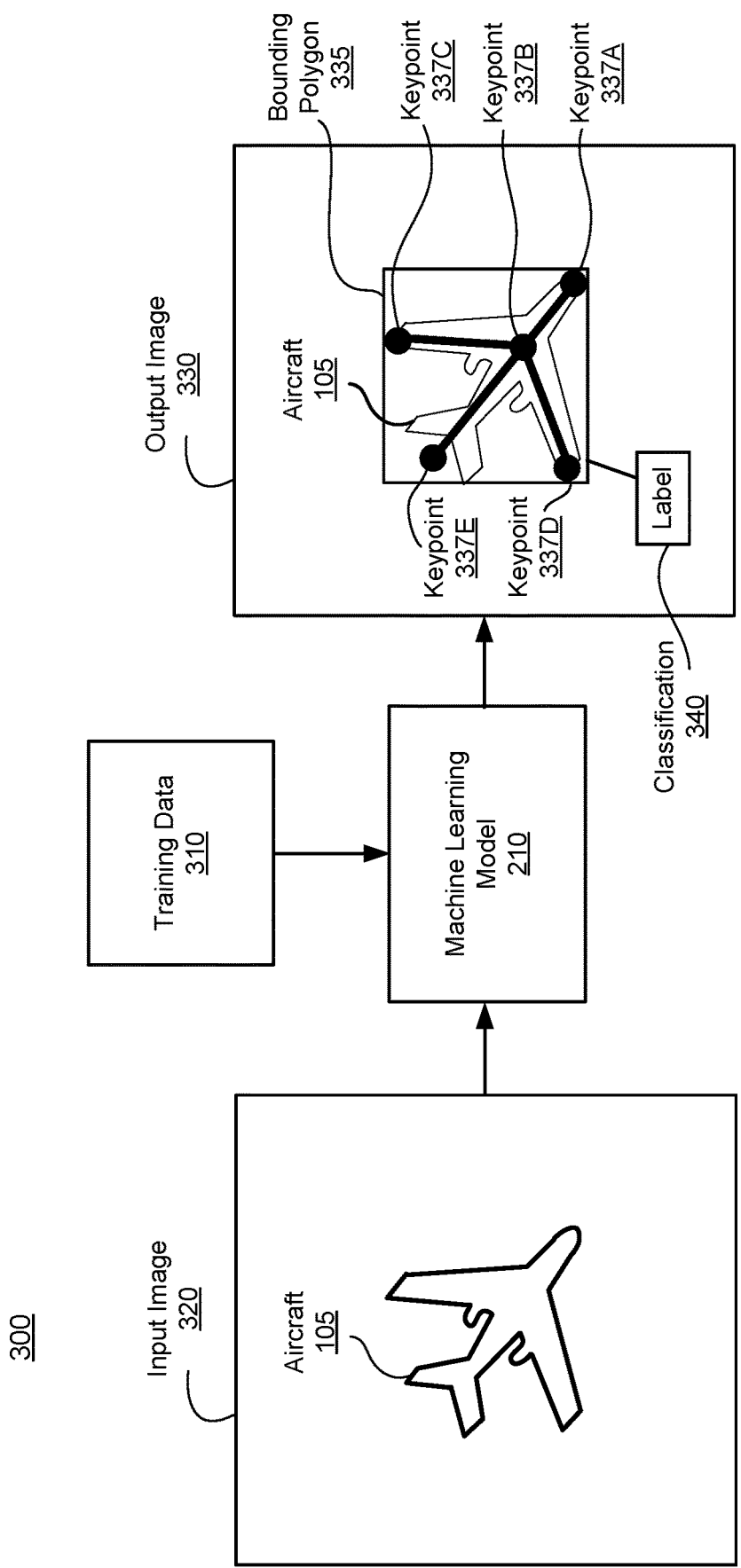
FIG. 3 illustrates a data flow diagram for the machine learning model of FIG. 2, in accordance with an embodiment.

FIG. 3 illustrates a data flow diagram for the machine learning model of FIG. 2, in accordance with an embodiment.

During training of the machine learning model 210, the aircraft classification system 120 may supply the machine learning model 210 with a set of training data 310. As described above, the training data 310 may include a plurality of labeled aerial images for each classification of aircraft. Each labeled image includes at least one aircraft and each aircraft in the labeled image may include a classification and a bounding polygon. In some embodiments, the labeled image may further include for each aircraft a plurality of keypoints corresponding to the aircraft.

During operation of the machine learning model 210, an aerial image may be supplied as an input image 320 into the machine learning model 210 of the aircraft classification system 120. The input image 320 includes one or more aircrafts 105. The machine learning model 210 outputs a bounding polygon 335 for each aircraft 105 captured in the input image 320. The machine learning model 210 additionally outputs a classification 340 (e.g., a label identifying a type of aircraft) and a plurality of keypoints 337 (e.g., a nose keypoint 337A, a center keypoint 337B, a left wing keypoint 337C, a right wing keypoint 337D, and a tail keypoint 337E). In some embodiments, the machine learning model 210 outputs an output image 330 that comprises the input image 320 with the one or more aircrafts 105, a bounding polygon 335 encompassing each aircraft 105, a classification 340 in the form of a label for each aircraft 105, and a plurality of keypoints 337 included within each bounding polygon 335. The output image 330 may be provided to the measurement determination engine 220 and to the sub-classification determination engine 230 for further analysis. In some embodiments, the output image 330 may be presented to a user of the aircraft classification system 120 (e.g., via the communication engine 240).

Example Machine Architecture

Figure 4:
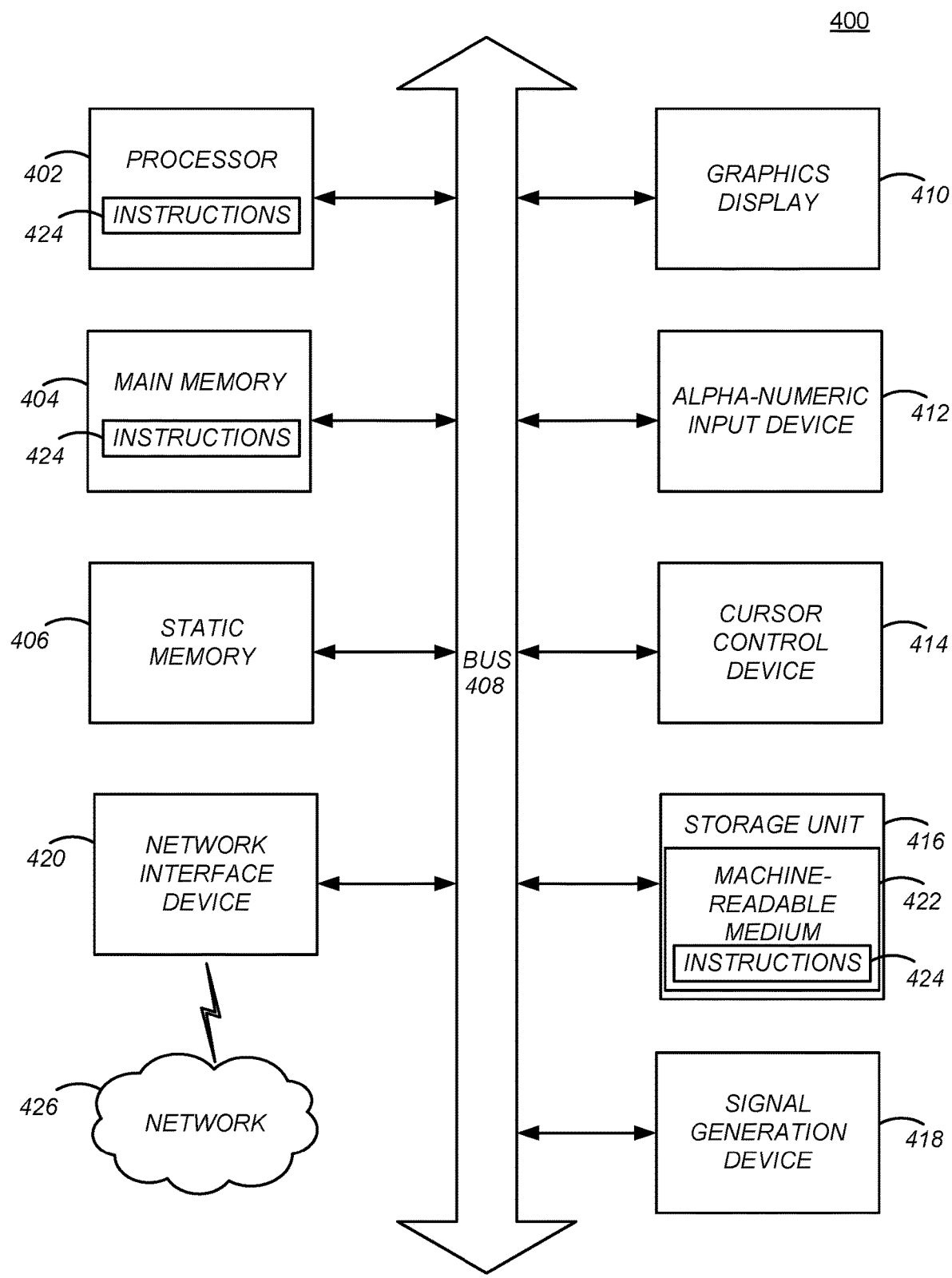
FIG. 4 is a block diagram illustrating components of an example machine able to read instructions from a machine-readable medium and execute them in a processor or controller.

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies (or processes) described herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. It is noted the instructions 424 correspond to the functionality of components and/or processes described herein, for example, with respect to FIGS. 1, 2, and 5.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include a visual display interface 410. The visual display interface 410 may include a software driver that enables displaying user interfaces on a screen (or display). The visual interface 410 may display user interfaces directly (e.g., on the screen) or indirectly on a surface, window, or the like (e.g., via a visual projection unit). For ease of discussion the visual interface may be described as a screen. The visual display interface 410 may include or may interface with a touch enabled screen. The computer system 400 also may include alphanumeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Example Process Flow

Figure 5:
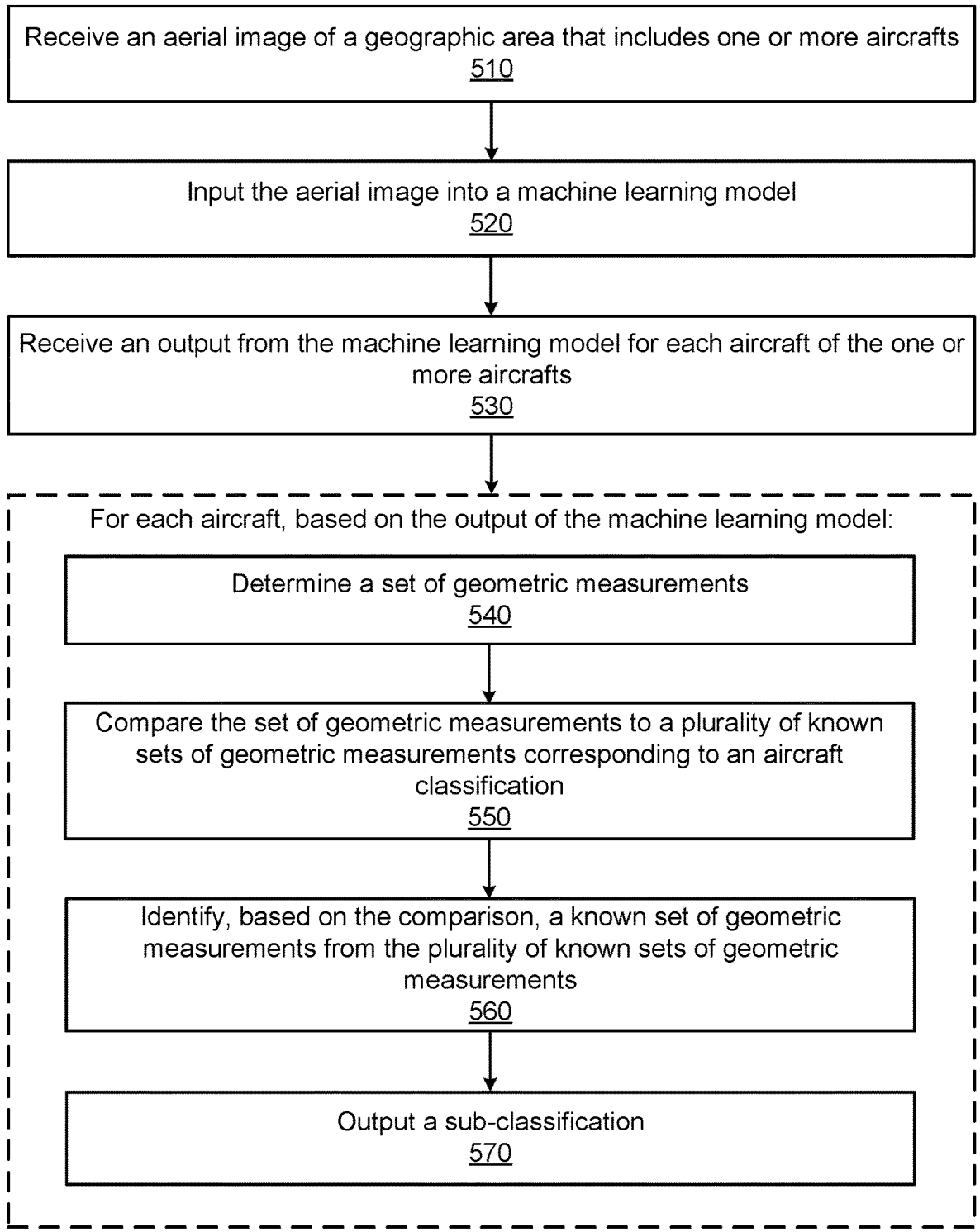
FIG. 5 is a flow diagram illustrating a process for classifying aircraft using an aircraft classification system, in accordance with an embodiment.

FIG. 5 is a flow diagram illustrating a process for classifying aircraft using an aircraft classification system, in accordance with an embodiment. In some example embodiments, the process 500 may have different and/or additional steps than those described in conjunction with FIG. 5. Steps of the process 500 may be performed in different orders than the order described in conjunction with FIG. 5. Some steps may be executed in parallel. Alternatively, some of the steps may be executed in parallel and some steps executed sequentially. Alternatively, some steps may execute in a pipelined fashion such that execution of a step is started before the execution of a previous step. In one embodiment, the process 500 (e.g., a set of instructions 424) is performed by the aircraft classification system 120 (e.g., a processor 402).

The aircraft classification system 120 receives 510 an aerial image of a geographic area that includes one or more aircrafts. The aerial image may be received from an aerial imaging device (e.g., the aerial imaging device 110). The aircraft classification system 120 inputs 520 the aerial image into a machine learning model (e.g., the machine learning model 210). For example, the aerial image may be provided (e.g., via the bus 408) to the machine learning model from the aerial image data store 130. The aircraft classification system 120 receives 530 an output for each aircraft (e.g., the output image 330 with a bounding polygon corresponding to each aircraft, a classification for each aircraft, and a plurality of keypoints for each aircraft) from the machine learning model.

For each aircraft, based on the output of the machine learning model, the aircraft classification system 120 determines 540 a set of geometric measurements corresponding to the aircraft. The set of geometric measurements may include a length, a wingspan, a sweep angle, and any other suitable geometric measurement that describes the aircraft. The set of geometric measurements may be determined by the measurement determination engine 220 (e.g., a processor 402) of the aircraft classification system 120. For example, the measurement determination engine 220 analyzes the plurality of keypoints to determine the set of geometric measurements. The aircraft classification system 120 compares 550 the set of geometric measurements to a plurality of known sets of geometric measurements corresponding to the classification. The comparison may be performed by the sub-classification determination engine 230 (e.g., a processor 402) of the aircraft classification system 120. The plurality of known sets of geometric measurements may be stored in an aircraft data store (e.g., the aircraft data store 140). The known sets of geometric measurements that correspond to the classification may be provided (e.g., via the bus 408) to the sub-classification determination engine 230 from the aircraft data store 140. The aircraft classification system 120 identifies 560, based on the comparison, a known set of geometric measurements from the plurality of known sets of geometric measurements. The sub-classification determination engine 230 may identify the known set of geometric measurements due to the geometric measurements of the known set being within a predetermined threshold of the geometric measurements of the set of geometric measurements. The identified known set is mapped by a database (e.g., the aircraft data store 150) to a sub-classification. The aircraft classification system 120 outputs 570 the sub-classification. The sub-classification may be displayed (e.g., via a graphics display 410) to a user of the aircraft classification system 120.

Additional Considerations

Beneficially, the systems and processes described herein, improve the speed, accuracy and efficiency of classifying vehicles (e.g., aircrafts) located at a geographic area using aerial imagery (e.g., satellite imagery). For example, various organizations and enterprises often rely on manual classification methods to classify vehicles depicted in aerial imagery. In many instances, one aerial image may include tens, hundreds, or thousands of vehicles for classification. Manual classification methodologies are time-consuming, labor-intensive, require extensive training, and can lead to inaccurate classifications. Additionally, a value of any intelligence gleaned from a classification using a manual methodology may be trivial. For example, the classification may take a significant amount of time to be determined manually by an individual, that by the time classification takes place, the vehicle may no longer be located at the geographic area. An aircraft classification system that allows for aerial imagery to be automatically analyzed (e.g., via a machine learning model and a heuristics-based approach) to determine a classification for aircraft may significantly reduce time spent (e.g., manual burden), greatly improve the accuracy of the results (e.g., not reliant on human input), and improve throughput. The aircraft classification system and processes described herein takes a highly complex manual task of performing a fine level categorization of an object from an aerial image (i.e., classifying the object based on a list of hundreds of possibilities) and automates the process to be fast and accurate.

Throughout this specification, plural instances may implement components, operations, or structures described as a single instance. Although individual operations of one or more methods are illustrated and described as separate operations, one or more of the individual operations may be performed concurrently, and nothing requires that the operations be performed in an order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with FIGS. 1-5. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 402, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for a system to classify vehicles (e.g., aircrafts) using aerial imagery. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising memory with instructions encoded thereon, the instructions, when executed, causing one or more processors to perform operations, the instructions comprising instructions to:
   receive an aerial image of a geographic area that includes one or more aircrafts;
   input the aerial image into a machine learning model;
   receive, as output from the machine learning model, for each aircraft of the one or more aircrafts:
      a bounding polygon corresponding to the aircraft,
      a classification, and
      a plurality of keypoints; and
   for each aircraft of the one or more aircrafts, based on the output of the machine learning model:
      determine a set of geometric measurements corresponding to the aircraft, wherein determining the set of geometric measurements corresponding to the aircraft comprises:
         forming a triangle with a tail keypoint, a center keypoint, and either a right wing keypoint or a left wing keypoint as vertices of the triangle; and
         determining a sweep angle by calculating a measurement for an angle of the triangle at a vertex corresponding to the center keypoint, wherein the angle of the triangle is trigonometrically related to the sweep angle;
      compare the set of geometric measurements to a plurality of known sets of geometric measurements corresponding to the aircraft classification,
      identify, based on the comparison, a known set of geometric measurements from the plurality of known sets of geometric measurements, the known set being mapped by a database to a sub-classification, and
      output the sub-classification.

2. The non-transitory computer-readable medium of claim 1, wherein the machine learning model is trained using training data comprising labeled images including at least one aircraft and, for each aircraft in the labeled images, at least one bounding polygon corresponding to the aircraft, as well as a label indicating a classification.

3. The non-transitory computer-readable medium of claim 2, wherein the training data is augmented to include a plurality of rotations of the labeled images.

4. The non-transitory computer-readable medium of claim 2, wherein the training data is augmented to include a plurality of adjustments of the labeled images.

5. The non-transitory computer-readable medium of claim 4, wherein the plurality of adjustments of the labeled images includes one or more of: an intensity adjustment, a contrast adjustment, and a jitter adjustment.

6. The non-transitory computer-readable medium of claim 2, wherein the instructions further comprise instructions to:
   in response to the machine learning model failing to provide an output for the aerial image, alert a user that the machine learning model failed;
   receive label instructions from the user that label the aerial image; and
   re-train the machine learning model using the labelled aerial image.

7. The non-transitory computer-readable medium of claim 1, wherein the geometric measurements of the known set of geometric measurements are within a predetermined threshold of the geometric measurements of the set of geometric measurements.

8. The non-transitory computer-readable medium of claim 1, wherein each known set of geometric measurements of the plurality of known sets of geometric measurements comprises a plurality of candidate geometric measurements, and wherein the instructions further comprise instructions to:
   analyze the known sets of geometric measurements to determine which candidate geometric measurements of the plurality of candidate geometric measurements uniquely identify the sub-classification when compared with the set of geometric measurements.

9. The non-transitory computer-readable medium of claim 1, wherein the plurality of keypoints include a nose keypoint, the tail keypoint, the right wing keypoint, the left wing keypoint, and the center keypoint, wherein the set of geometric measurements includes a length, a wingspan, and a sweep angle of the aircraft, and wherein the sub-classification includes a make and a model of the aircraft.

10. A system comprising:
   memory with instructions encoded thereon; and
   one or more processors that, when executing the instructions, are caused to perform operations comprising:
      receiving an aerial image of a geographic area that includes one or more aircrafts;

inputting the aerial image into a machine learning model;
receiving, as output from the machine learning model, for each aircraft of the one or more aircrafts:
a bounding polygon corresponding to the aircraft,
a classification, and
a plurality of keypoints; and
for each aircraft of the one or more aircrafts, based on the output of the machine learning model:
determining a set of geometric measurements corresponding to the aircraft, wherein instructions for determining the set of geometric measurements corresponding to the aircraft comprise:
forming a triangle with a tail keypoint, a center keypoint, and either a right wing keypoint or a left wing keypoint as vertices of the triangle; and
determining a sweep angle by calculating a measurement for an angle of the triangle at a vertex corresponding to the center keypoint, wherein the angle of the triangle is trigonometrically related to the sweep angle;
comparing the set of geometric measurements to a plurality of known sets of geometric measurements corresponding to the aircraft classification;
identifying, based on the comparison, a known set of geometric measurements from the plurality of known sets of geometric measurements, the known set being mapped by a database to a sub-classification; and
outputting the sub-classification.

11. The system of claim 10, wherein the machine learning model is trained using training data comprising labeled images including at least one aircraft and, for each aircraft in the labeled images, at least one bounding polygon corresponding to the aircraft, as well as a label indicating a classification.

12. The system of claim 11, wherein the training data is augmented to include a plurality of rotations of the labeled images.

13. The system of claim 11, wherein the training data is augmented to include a plurality of adjustments of the labeled images.

14. The system of claim 11, wherein the one or more processors are caused to perform operations further comprising:
in response to the machine learning model failing to provide an output for the aerial image, alerting a user that the machine learning model failed;
receiving label instructions from the user that label the aerial image; and
re-training the machine learning model using the labelled aerial image.

15. The system of claim 10, wherein the geometric measurements of the known set of geometric measurements are within a predetermined threshold of the geometric measurements of the set of geometric measurements.

16. The system of claim 10, wherein each known set of geometric measurements of the plurality of known sets of geometric measurements comprises a plurality of candidate geometric measurements, and wherein the one or more processors are caused to perform operations further comprising:
analyzing the known sets of geometric measurements to determine which candidate geometric measurements of the plurality of candidate geometric measurements uniquely identify the sub-classification when compared with the set of geometric measurements.

17. The system of claim 10, wherein the plurality of keypoints include a nose keypoint, the tail keypoint, the right wing keypoint, the left wing keypoint, and the center keypoint, wherein the set of geometric measurements includes a length, a wingspan, and a sweep angle of the aircraft, and wherein the sub-classification includes a make and a model of the aircraft.

18. A method, comprising:
receiving an aerial image of a geographic area that includes one or more aircrafts;
inputting the aerial image into a machine learning model;
receiving, as output from the machine learning model, for each aircraft of the one or more aircrafts:
a bounding polygon corresponding to the aircraft,
a classification, and
a plurality of keypoints; and
for each aircraft of the one or more aircrafts, based on the output of the machine learning model:
determining a set of geometric measurements corresponding to the aircraft, wherein determining the set of geometric measurements corresponding to the aircraft comprises:
forming a triangle with a tail keypoint, a center keypoint, and either a right wing keypoint or a left wing keypoint as vertices of the triangle; and
determining a sweep angle by calculating a measurement for an angle of the triangle at a vertex corresponding to the center keypoint, wherein the angle of the triangle is trigonometrically related to the sweep angle;
comparing the set of geometric measurements to a plurality of known sets of geometric measurements corresponding to the aircraft classification;
identifying, based on the comparison, a known set of geometric measurements from the plurality of known sets of geometric measurements, the known set being mapped by a database to a sub-classification; and
outputting the sub-classification.

* * * * *